US012525752B1

(12) United States Patent
Hellige et al.

(10) Patent No.: US 12,525,752 B1
(45) Date of Patent: Jan. 13, 2026

(54) PLUG CONNECTOR AND PLUG CONNECTOR ASSEMBLY

(71) Applicant: HARTING ELECTRIC GMBH & CO. KG, Espelkamp (DE)

(72) Inventors: Denny Hellige, Espelkamp (DE); Jens Horstmann, Guangdong (CN); Brandon Ding, Guangdong (CN)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 1105 days.

(21) Appl. No.: 17/606,374

(22) PCT Filed: Apr. 15, 2020

(86) PCT No.: PCT/DE2020/100302

§ 371 (c)(1),
(2) Date: Oct. 25, 2021

(87) PCT Pub. No.: WO2020/216409

PCT Pub. Date: Oct. 29, 2020

(30) Foreign Application Priority Data

Apr. 24, 2019 (CN) ........................ 201910336106.1

(51) Int. Cl.
*H01R 13/6592* (2011.01)
*H01R 13/52* (2006.01)
*H01R 13/6598* (2011.01)

(52) U.S. Cl.
CPC ..... *H01R 13/6592* (2013.01); *H01R 13/5205* (2013.01); *H01R 13/6598* (2013.01)

(58) Field of Classification Search
CPC ............ H01R 13/6592; H01R 13/5205; H01R 13/6598
See application file for complete search history.

(56) References Cited

U.S. PATENT DOCUMENTS 3,744,007 A 7/1973 Horak ......................... 339/97 R
4,739,126 A * 4/1988 Gutter .................... H02G 3/065 439/98

(Continued)

FOREIGN PATENT DOCUMENTS

CN 202094411 12/2011 ............. H01R 13/58
CN 205406827 7/2016 ........... H01R 13/514

(Continued)

OTHER PUBLICATIONS

Search Report issued in related Russian Patent Application Serial No. 2021134021, dated May 16, 2022, with translation, 4 pgs.

(Continued)

*Primary Examiner* — Travis S Chambers
(74) *Attorney, Agent, or Firm* — HAYES SOLOWAY P.C.

(57) ABSTRACT

A plug connector for electrically connecting an electrical cable, attached thereto, to a mating connector has at least one electrically conductive contact an insulating inner housing which has a fastening portion for fastening the contact a conductive outer housing which has a fastening portion for fastening the inner housing; wherein the plug connector also including a first shielding element, which is electrically connected to the conductive outer housing and can penetrate an insulating outer layer of a cable connected the plug connector and establishes electrical contact with the electromagnetic shielding layer in the insulating outer layer of the cable, in order to provide for an additional electromagnetic shielding function for the cable.

16 Claims, 14 Drawing Sheets

(56) References Cited

U.S. PATENT DOCUMENTS

| | | | | | |
|---|---|---|---|---|---|
| 5,066,248 | A * | 11/1991 | Gaver, Jr. | H01R 9/053 439/578 |
| 5,529,522 | A * | 6/1996 | Huang | H01R 9/0527 439/441 |
| 5,823,803 | A | 10/1998 | Majors | 439/98 |
| 5,942,730 | A * | 8/1999 | Schwarz | H02G 15/04 174/84 R |
| 9,531,090 | B2 | 12/2016 | Burris et al. | |
| 2004/0248466 | A1 | 12/2004 | McCarthy | 439/584 |
| 2009/0215306 | A1 | 8/2009 | Hanks | 439/427 |
| 2011/0250789 | A1 | 10/2011 | Burris et al. | 439/578 |

FOREIGN PATENT DOCUMENTS

| | | | |
|---|---|---|---|
| CN | 106688145 | 5/2017 | H01R 9/053 |
| CN | 108039598 | 5/2018 | H01R 13/02 |
| CN | 108649400 | 10/2018 | H01R 27/00 |
| DE | 199 55 666 | 3/2001 | H01R 43/01 |
| EP | 2595247 | 5/2013 | H01R 9/05 |
| EP | 3 410 543 | 12/2018 | H01R 13/52 |
| GB | 1 206 362 | 9/1970 | H02G 15/00 |
| GB | 2504347 | 1/2014 | H01R 24/40 |
| RU | 2172048 | 5/1997 | |
| WO | WO 97/34340 | 9/1997 | H01R 9/05 |

OTHER PUBLICATIONS

International Search Report and Written Opinion issued in PCT/DE2020/100302, dated Jul. 6, 2020, with English translation, 22 pages.

International Preliminary Report on Patentability issued in PCT/DE2020/100302, dated Sep. 28, 2021, 8 pages.

Official Action issued in related Chinese Patent Application Serial No. 201910336106.1, dated Feb. 1, 2022, with translation, 18 pgs.

* cited by examiner

PLUG CONNECTOR AND PLUG CONNECTOR ASSEMBLY

CROSS REFERENCE TO RELATED APPLICATION

This application is a 371 filing based on PCT International Patent Application Serial No. PCT/DE2021/100302, filed Apr. 15, 2020, which claims benefit of German Patent Application Serial No. 201910336106.1, dated Apr. 24, 2019, the contents of which are incorporated herein by reference.

BACKGROUND OF THE INVENTION

The present invention relates to a plug connector for connection to a mating plug in the field of quick-connection technology, in particular for the purpose of transmitting high currents and with good EMC properties. The present invention furthermore relates to a plug connector assembly with such a plug connector and such a mating plug.

DISCUSSION OF THE PRIOR ART

As science and technology have developed, the pursuit of green energy by governments has become more intensified. Electrical energy is therefore used more and more often in many areas, for example in the automobile industry, in particular in rail and road transport. In this case, there are particular performance requirements in terms of power transmission. For example, the charging of this means of transport requires energy transmission at relatively high voltages and/or relatively high currents. There is therefore a particular need for plug connectors which transmit high currents.

In the prior art, the transmission cables for transmitting high voltages and high currents have already been improved. An EMC layer, namely an electromagnetic shielding layer, is provided in the outer insulating layer of the transmission cable in order to prevent a magnetic field caused by the transmitted high voltages or currents from disturbing the normal operation of electronic appliances situated in the vicinity. However, a part of the existing plug connector affords a shielding function from electromagnetic disturbance only in the interior of the current- or signal-transmitting plug connector, in particular for the contacts, which is insufficient for the transmission of relatively high voltages and currents.

SUMMARY OF THE INVENTION

The object of the present invention is accordingly to make available a plug connector which provides an additional electromagnetic shielding function and solves the problem described of transmitting high voltages and/or high currents.

According to an aspect of the present invention, a plug connector is made available for electrically connecting a cable attached thereto to a mating plug, comprising: at least one conductive contact; an insulating inner housing which has a fastening section for fastening the contacts; a conductive outer housing which has a fastening section for fastening the inner housing. The plug connector furthermore comprises a first shielding element, electrically connected to the conductive outer housing, which can contact an insulating outer layer of the cable connected to the plug connector and hence establishes an electrical contact with the electromagnetic shielding layer in the insulating outer layer of the cable in order to provide a further electromagnetic shielding function for the cable.

According to the present invention, the first shielding element establishes in each case an electrical connection to the conductive outer housing and the electromagnetic shielding layer of the cable. An additional electromagnetic shielding function can therefore be provided inside the cable and the plug connector, as a result of which the requirements for external electronic appliances with regard to electromagnetic interference can be met when transmitting relatively high voltages or currents.

In a preferred embodiment of the present invention, the first shielding element is designed in the form of an inverted triangle, the upper side of which is in conductive contact with the conductive outer housing, whilst the lower apex is in electrical contact with the electromagnetic shielding layer of the cable.

In another preferred exemplary embodiment of the present invention, the first shielding element is produced from metal, the metal being a stainless metal. The metal is preferably an aluminum alloy, the surface of which is electrolessly nickel-plated.

Alternatively or additionally, the first shielding element can be made from copper, steel, aluminum, and/or brass or at least comprise these materials.

In a further preferred exemplary embodiment of the present invention, the plug connector comprises a second shielding element, accommodated in the conductive outer housing, which can be in electrical contact with the conductive outer housing of the plug connector and the conductive outer housing of a mating plug connected to the plug connector in order to provide a further electromagnetic shielding function for the cable.

In a further preferred exemplary embodiment of the present invention, the second shielding element is an annular spring ring which is in peripheral contact with the conductive outer housing of the plug connector and the conductive outer housing of the mating plug. As a result, a better electromagnetic shielding can be provided between the plug connector and the mating plug.

In a preferred embodiment, the second shielding element can be a round spring, a triangular spring, or a laminated spring and/or the second shielding element can have brush contacts.

In a further embodiment, the first shielding element can be a round spring, a triangular spring, or a laminated spring and/or the first shielding element can have brush contacts.

These embodiments have, in particular in a suitable combination, the advantage that the relevant transition resistance can be adapted specifically to the requirements of the respective application.

In a further preferred exemplary embodiment of the present invention, the first and/or the second shielding element is produced from stainless metal. The metal can in particular be an aluminum alloy. In particular, its surface can be electrolessly nickel-plated.

Alternatively or additionally, the second shielding element can be made from copper, steel, aluminum, or brass or at least comprise these materials.

In a further preferred exemplary embodiment of the present invention, the plug connector comprises an insulating sealing element, accommodated in the conductive outer housing, which is in contact with the outer insulating layer of the cable in order to provide a watertight seal. The plug connector furthermore comprises an L-shaped compression element in order to transmit the thrust force simultaneously to the sealing element, owing to a connection between the fastening element of the plug connector and the conductive outer housing, such that the sealing element expands radially and hence forms a solid sealing fit with the cable.

In a further preferred exemplary embodiment of the present invention, the conductive outer housing is produced from metal, the metal being electrolessly nickel-plated aluminum.

According to another aspect of the present invention, a plug connector assembly is made available, comprising the above plug connector and a mating plug coupled to the plug connector, wherein the mating plug comprises: a conductive contact; an insulating inner housing which has a fastening section for fastening the contact; and a conductive outer housing which has a fastening section for fastening the inner housing. The mating plug furthermore comprises a third shielding element, connected conductively to the conductive outer housing, which can contact an insulating outer layer of the cable connected to the mating plug, and establishes electrical contact with the electromagnetic shielding layer in the insulating outer layer of the cable in order to provide a further electromagnetic shielding function for the cable.

In a further preferred exemplary embodiment of the present invention, the third shielding element is designed in the form of an inverted triangle, the upper side of which is in conductive contact with the conductive outer housing of the mating plug, whilst the lower apex is in electrical contact with the electromagnetic shielding layer of the cable.

A preferred plug connector assembly is characterized in that the first shielding element, the second shielding element, and the third shielding element each form an electrical contact with the outer housing of the plug connector and the outer housing of the mating plug in order to provide complete electromagnetic shielding for a cable connected by the plug connector and the mating plug, and for the plug connector assembly.

In a further preferred exemplary embodiment of the present invention, the second shielding element is produced from metal, in particular from stainless metal.

In the present invention, a first shielding element, a second shielding element, and a third shielding element are produced from metal and are each electrically conductively connected to a braided EMC layer of the cable and the conductive outer housing, which is also produced from metal. As a result, excellent electromagnetic shielding is provided both for the cable and the plug connector and the mating plug to which it is plugged. The transmission can thus be generated in a more reliable and stable fashion, with no electromagnetic interference for electronic appliances in the surroundings. Lastly, in the prior art, many plug connectors provided for signal transmission do not have any shielding function, as a result of which their transmitted signals are electromagnetically influenced by the peripheral surroundings. The plug connector according to the invention can, however, prevent the electromagnetic influence on the peripheral surroundings.

BRIEF DESCRIPTION OF THE DRAWINGS IN THE DRAWINGS

DETAILED DESCRIPTION OF THE INVENTION

The present invention is explained in detail below with the aid of detailed exemplary embodiments and drawings. It should be pointed out that the exemplary embodiments described only represent preferred embodiments and are not to be seen as limiting for the protective scope of the present invention. An average person skilled in this art can undertake various further variations for the present invention on the basis of the concept and the disclosed content of the present invention and they should be viewed as covered by the protective scope of the present invention.

The terms "axial direction" and "direction of insertion" have essentially the same meaning in the present invention. It should, however, be noted that the technical term "direction of insertion" has directionality, whereas "axial direction" does not have directionality. The direction of the terms "forward" and "backward" is respectively defined below on the basis of the direction of insertion. When the plug and the mating plug according to the present invention are being or are inserted into each other and hence form a plug connector assembly, when the plug connector and the mating plug are explained the terms "forward" and "backward" are not absolutely identical if the direction of insertion of the plug connector and the mating plug is reversed. This is obvious to a person skilled in this art. Furthermore, the technical terms "inner" and "outer" are in each case defined on the basis of the radial direction of the plug connector, the technical terms "inward", "inner side", etc relate to a direction running in the radial direction and toward the center line, and the technical terms "outward", "outer side", etc relate to a direction running in the radial direction and away from the center line.

Figure 1:
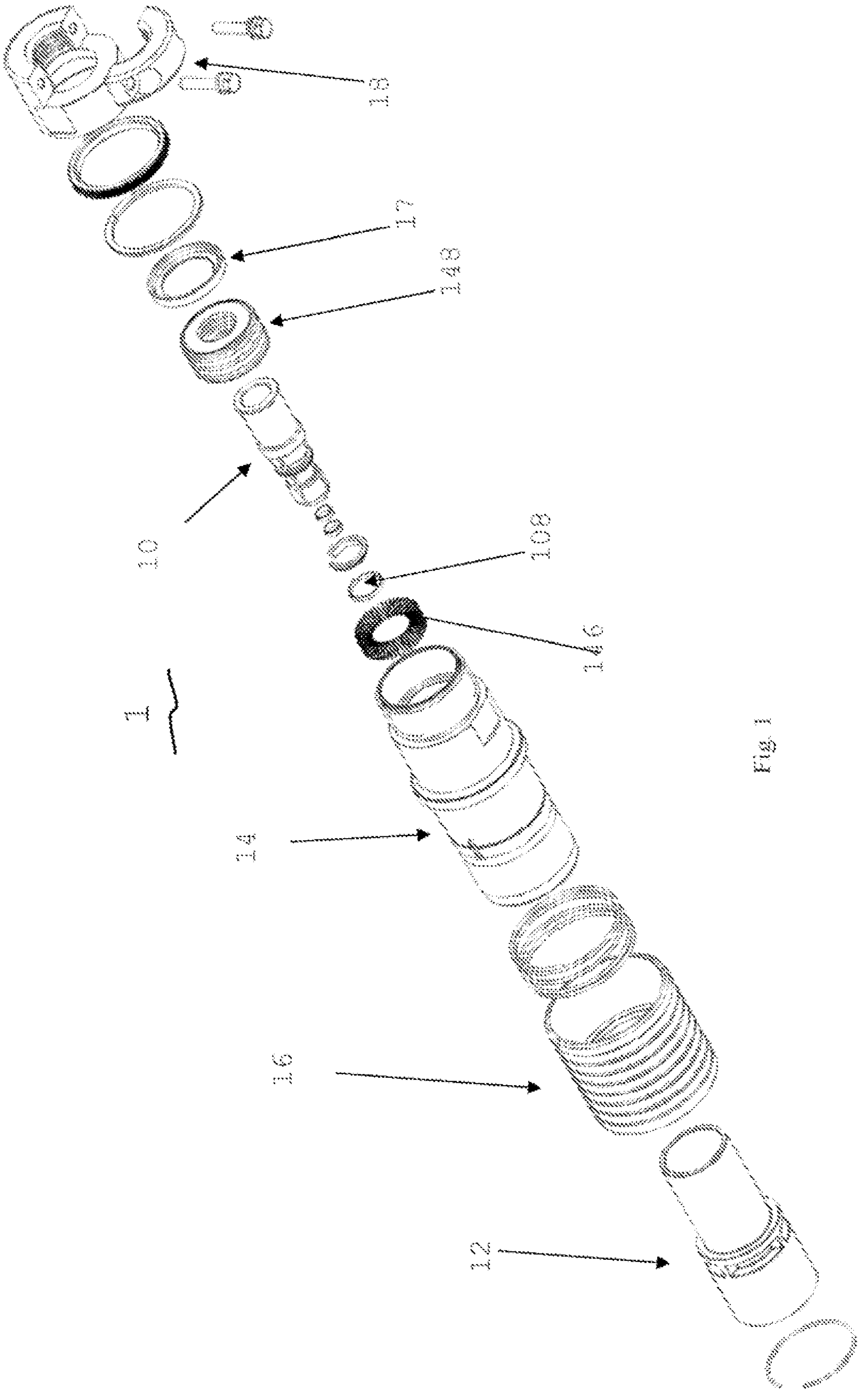
FIG. 1 shows a perspective exploded view of a plug connector according to the present invention.

As illustrated in FIG. 1, the plug 1 according to the present invention comprises essentially a metal contact 10, an inner housing 12, an outer housing 14, and a sliding element 16 which can slide on the outer housing 14.

Figure 2:
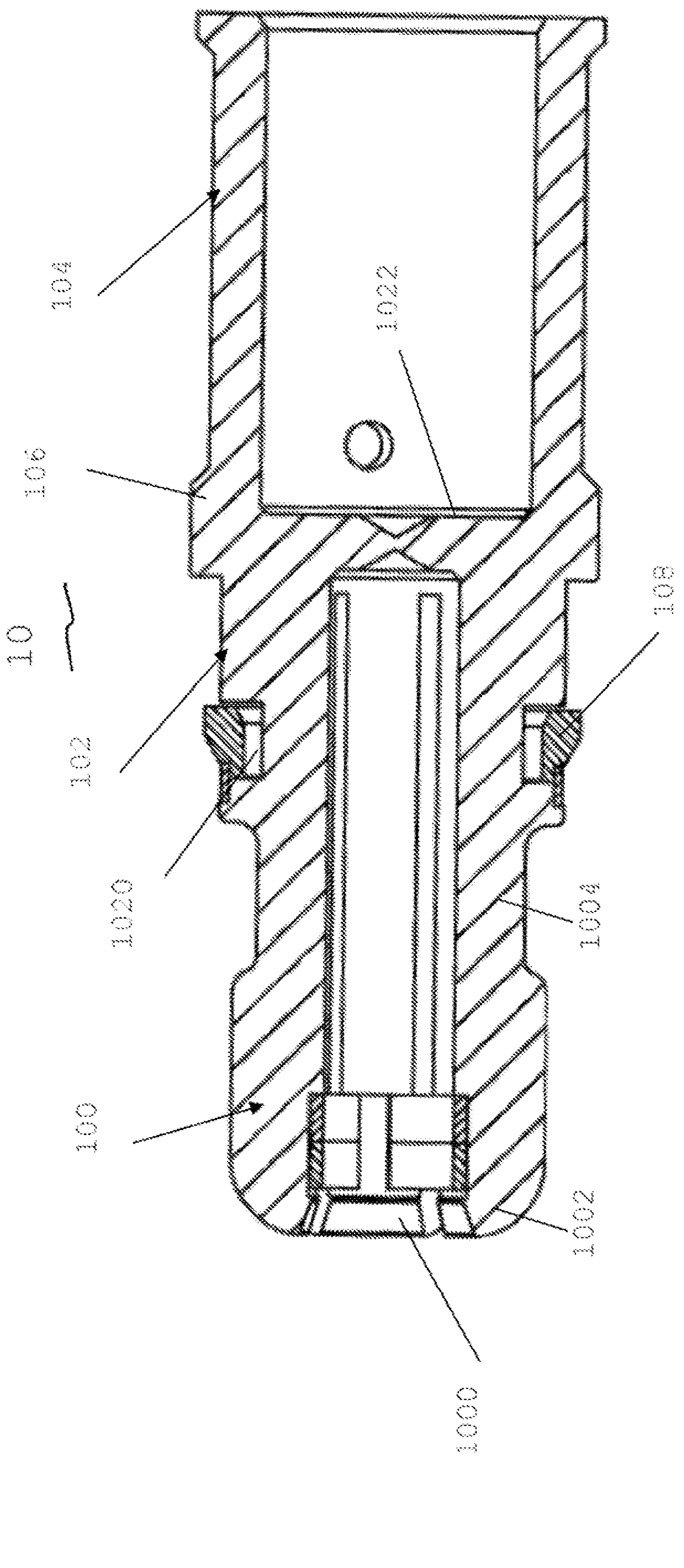
FIG. 2 shows a view in section of a contact of the plug connector according to the present invention.

As illustrated in FIG. 2, the overall form of the contact 10 is essentially cylindrical, wherein the contact is produced as a single piece from C1100 copper. Seen in the direction of insertion, the contact comprises, consecutively, a contact insertion section 100, a contact fastening section 102, and a contact connecting section 104. The internal diameter of the contact 10 at the contact insertion section 100 and the contact fastening section 102 is here smaller than the internal diameter at the contact connecting section 104, wherein a cable termination surface 1022 averted from the direction of insertion is defined on the contact fastening section 102. At the connecting point between the contact fastening section 102 and the contact connecting section 104, the contact 10 has an abutment section 106 on the outer surface, wherein the abutment section 106 is an annular flange.

The contact insertion section 100 comprises in its circumferential direction a plurality of slots 1000 extending in the axial direction and preferably extending as far as the contact fastening section 102. Furthermore, the outer surface of the contact insertion section 100 has at the front end, seen in the direction of insertion, an outer curvature in order to quickly and simply effect insertion into the contact 20 of a corresponding mating plug 2.

In the direction of insertion, the contact 10 moreover has at the rear end of the contact insertion section 100 a recess 1004, wherein the contact 10 has a contact fastening recess 1020 at the front end of the contact fastening section 102 in order to receive an elastic fastening element 108 produced from rubber.

Figure 3:
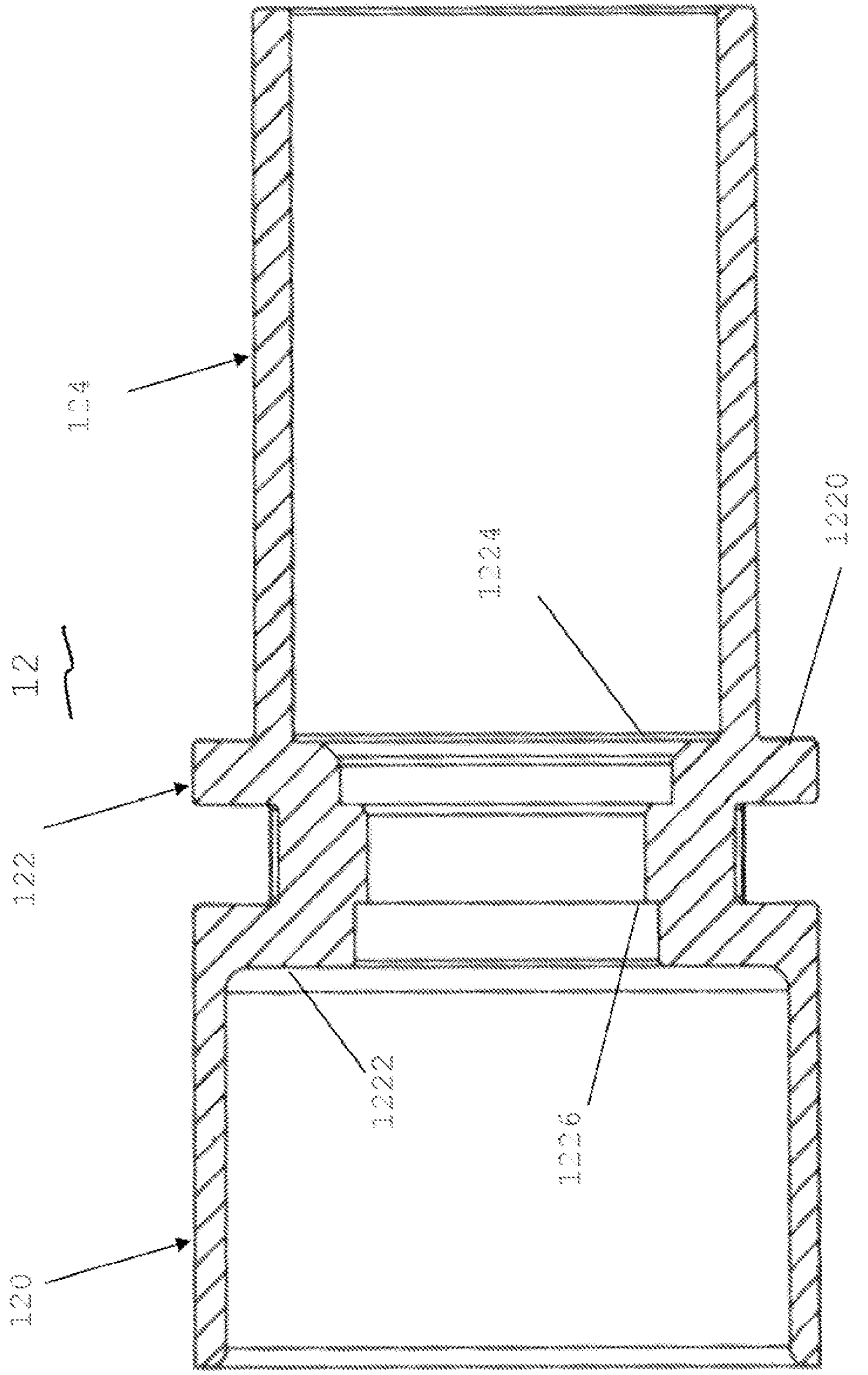
FIG. 3 shows a view in section of an inner housing of the plug connector according to the present invention.

As illustrated in FIG. 3, the inner housing 12 of the plug connector 1 is an insulating housing which has an essentially cylindrical overall shape and is produced as a single piece from an insulating material, preferably from insulating rubber (EPDM and SR) or plastic (PPS). Seen in the direction of insertion, the inner housing comprises, consecutively, an inner housing insertion section 120, an inner housing fastening section 122, and an inner housing connecting section 124. The external diameter of the inner housing fastening section 122 is preferably the same as the external diameter of the inner housing insertion section 120, whilst the internal diameter of the inner housing fastening section 122 is smaller than the internal diameter of the inner housing insertion section 120. An inwardly protruding projection, which has a blocking surface 1222 facing the direction of insertion, is thus formed between the two. In the event that excessive force is applied during insertion, the contact can be protected from damage by the blocking surface 1222.

Furthermore, the internal diameter of the inner housing fastening section 122 is essentially the same as that of the contact fastening section 102, whilst the inner housing fastening section has a stepped section 1226 in order to connect the inner housing fastening section to the elastic fastening element 108 of the contact 10, accommodated in the fastening recess 1020 of the contact 10, such that the contact 10 can be prevented from moving counter to the direction of insertion. Compared with the inner housing fastening section 122, the internal diameter of the inner housing connecting section 124 is larger than the internal diameter of the inner housing fastening section 122, whilst its external diameter is smaller than the external diameter of the inner housing fastening section 122. As a result, a contact limiting surface 1224 and a limiting surface 1220 of the inner housing is in each case defined on the inner and outer side of the insertion point.

Figure 4:
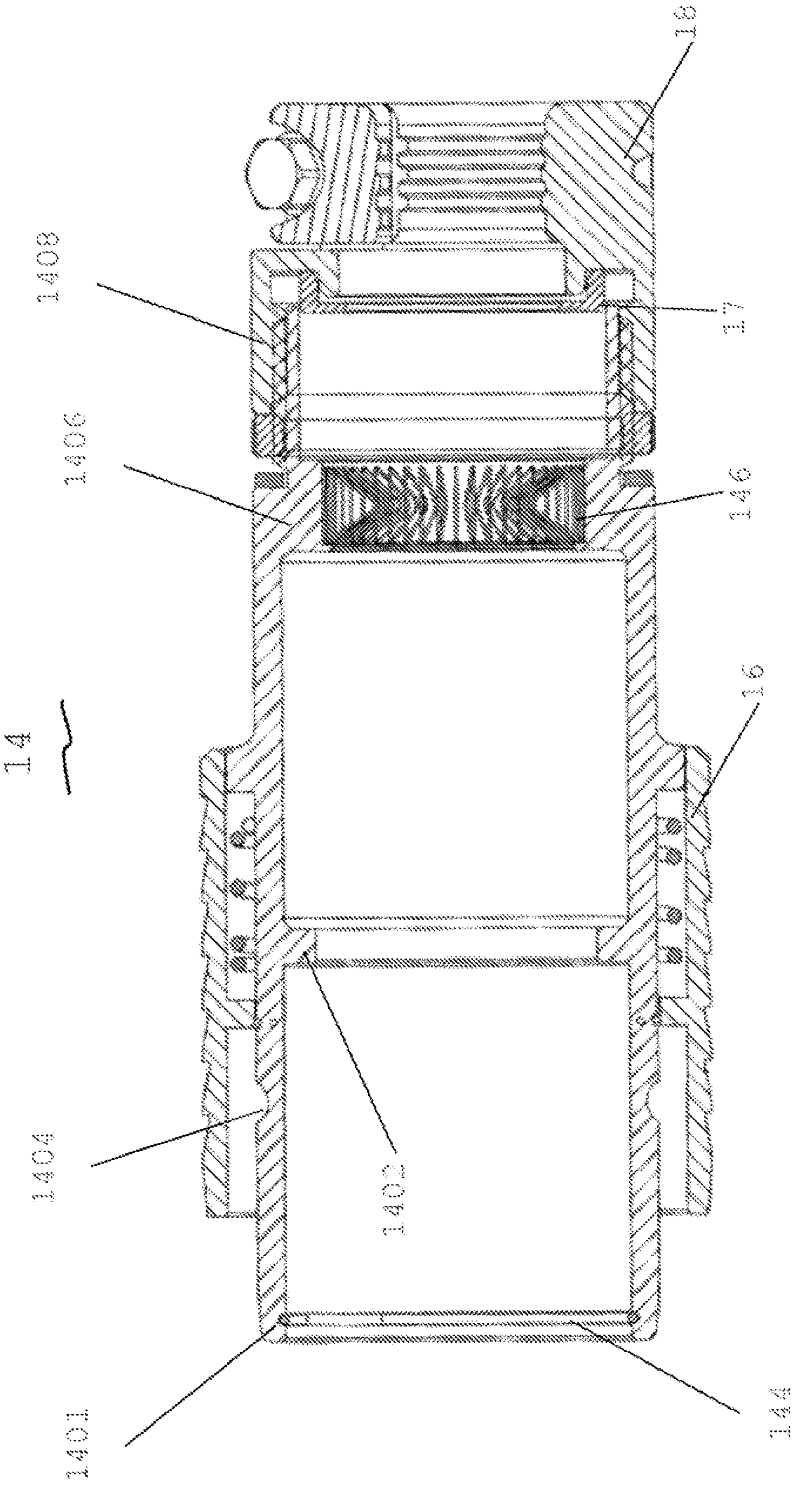
FIG. 4 shows a view in section of an outer housing and a sliding element of the plug connector according to the present invention.

As illustrated in FIG. 4, the outer housing 14 of the plug connector 1 is produced from metal and likewise has an essentially cylindrical overall shape. A groove 1401 is provided on the inner surface of its front end in order to receive an elastic retaining ring 144 and hence retain the inner housing 12 inside the outer housing 14. On the inner surface of the central section, the outer housing 14 has an inwardly protruding limiting projection 1402 of the inner housing in order to connect the outer housing to the inner housing limiting surface 1220 of the inner housing 12 and hence limit movement of the inner housing counter to the direction of insertion.

The outer housing 14 has, at its rear end, an inwardly protruding shielding element accommodating section 1406 for accommodating the shielding element 146 in order to electromagnetically shield an attached high-current cable.

Furthermore, a sealing element accommodating section 1408 is arranged on the outer housing 14, behind the shielding element accommodating section 1406, in order to accommodate the elastic sealing element 148 on the inner side. A thread is provided on the outer housing on the outer surface of the sealing element accommodating section 1408 in order to form a threaded connection to the fastening element 18, likewise produced from metal, such that the elastic sealing element 148 is fastened on the sealing element accommodating section 1408.

Figure 5:
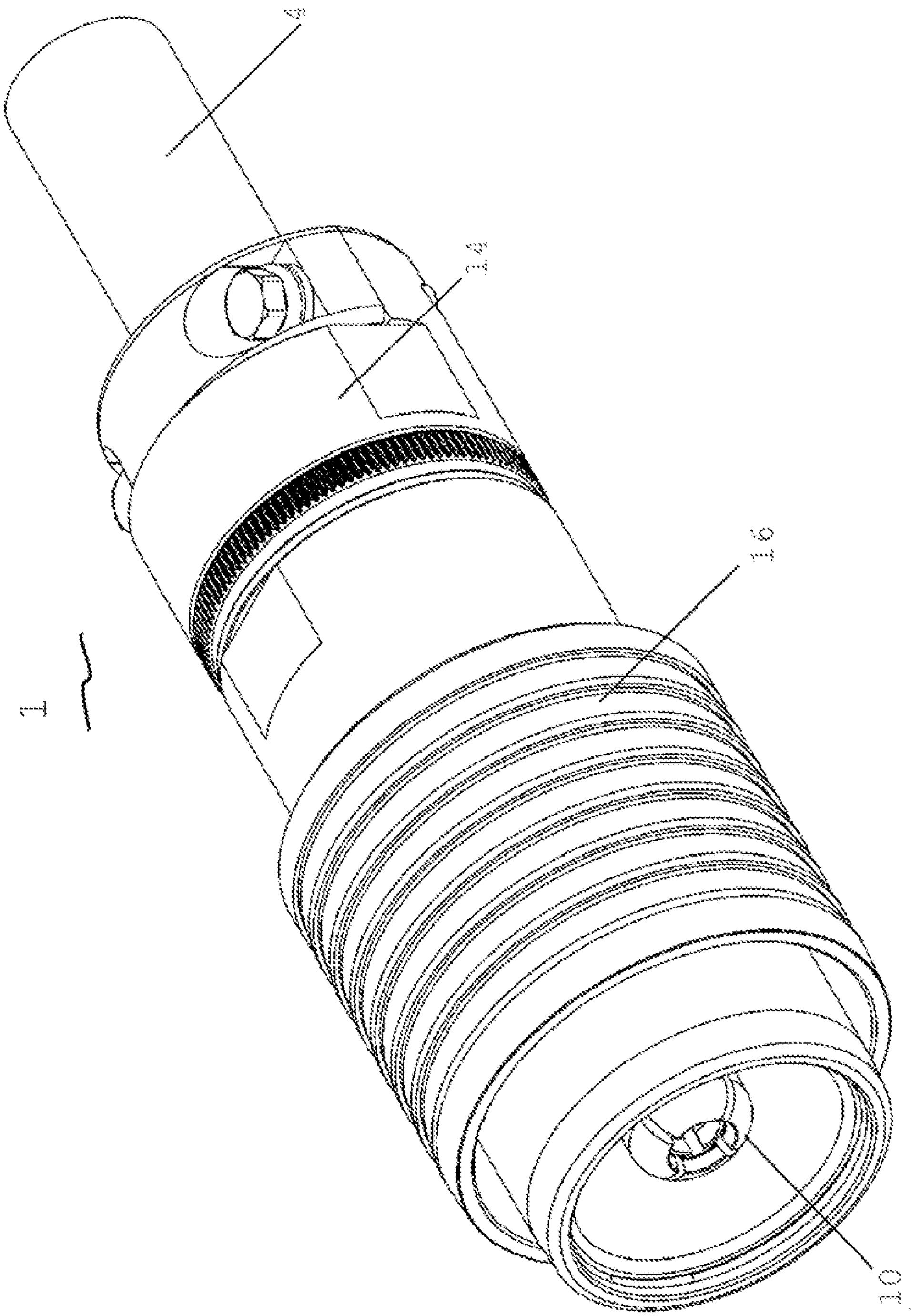
FIG. 5 shows a perspective view of an installed plug connector with a cable according to the present invention.

FIG. 5 shows in perspective a plug connector according to the present invention with a cable attached thereto. During the installation, the insulating outer layer at the front end of the cable 4 is removed, together with the EMC braid, to a length of approximately 30 mm in order to expose the wire core inside. The fastening element 18 of the plug connector 1, the L-shaped compression ring 17, and the sealing element 148 according to the invention are then pushed consecutively onto the cable counter to the direction of insertion. The contact 10 is then pushed onto the wire core of the cable 6 until the crimping position is reached. The front end section of the wire core of the cable 6 now bears against the cable termination surface 1022 of the connecting section 102 of the contacts 10. At the crimping position, the contact connecting section 104 of the contact 10 is pressed by a crimping tool such that the inner surface of the contact connecting section 104 bears firmly against the wire core of the cable 4.

At the same time, or before or afterward, the inner housing of the plug connector 1 according to the present invention is fitted into the outer housing 14. Namely, the inner housing 12 is plugged into the outer housing 14 counter to the direction of insertion until the limiting surface 1220 of the inner housing 12 and the limiting projection 1402 of the outer housing 14 bear against each other. The elastic retaining ring 144 accommodated in the groove 1401 of the outer housing 14 now springs inward in order to limit a forward movement of the inner housing 12 in the direction of insertion. The inner housing 12 of the plug connector 1 is thus fastened firmly in the outer housing 14.

If the contact 10 is plugged into the inner housing 12 on which the outer housing 14 has already been installed, until a "click" is heard, this indicates that the contact 10 has reached the engaged position in the inner housing 12. In the engaged position, the abutment section 106 of the contact 10 and the contact limiting surface 1224 of the inner housing 12 bear against each other in order to prevent the contact 10 from moving further forward, whilst the elastic fastening element 108 situated in the contact fastening recess 1020 of the contact springs up radially outward and encloses the stepped section 1226 of the inner housing 12 in order to prevent a backward movement of the contact 10.

If the sealing element 148 is pushed in the direction of insertion into the interior of the sealing element accommodating section 1408 of the outer housing 14, the fastening element 18 is connected to the outer housing 14 by the thread. In this case, the fastening element 18 pushes the L-shaped compression ring 17 forward such that the thrust force is exerted uniformly on the sealing element 148 by the front surface of the L-shaped compression ring 17 (see FIG. 6) such that the sealing element 148 is compressed in the axial direction in order to generate expansion in the radial direction. A close contact with the outer surface of the cable 4 thus results, as a result of which a good sealing effect is obtained. The fastening screw is then tightened in order to fasten the cable 4 firmly to the plug 1.

Figure 6:
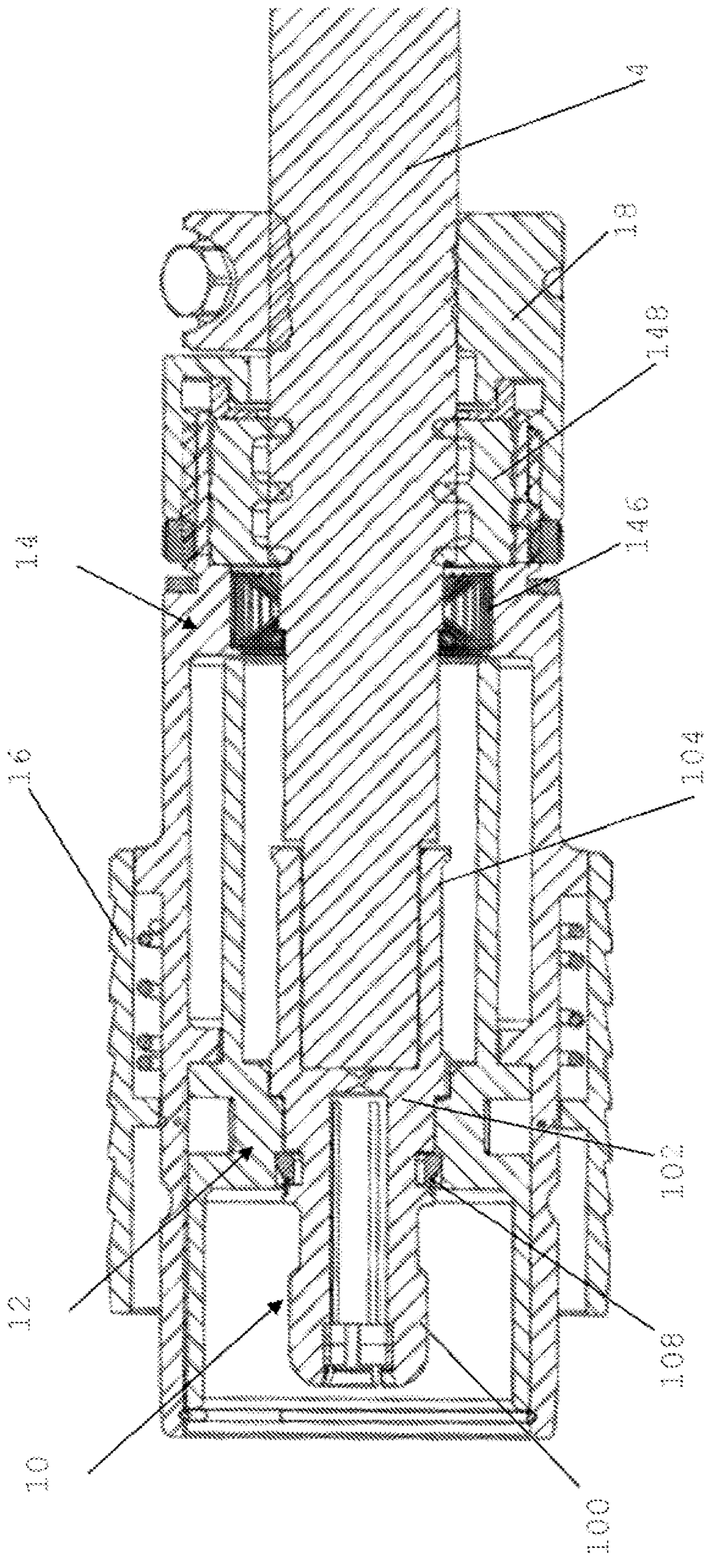
FIG. 6 shows a view in section of a plug connector and a cable after installation according to the present invention.

A view in section of the plug connector 1 and the cable 4 after installation is illustrated in FIG. 6. It can be seen in FIG. 6 that the contact 2, owing to the elastic fastening element 108 accommodated in the recess 1020, the contact and the abutment section 106 are in each case connected to the stepped section 1226 and the contact limiting surface 1224 on the inner side of the inner housing 12 and hence fastened in the intended position of the inner housing 12, wherein the contact cannot move forward or backward in the axial direction by virtue of the fit between with the inner housing. The inner housing 12 fits together with the limiting projection 1402 of the outer housing 14 and the elastic retaining ring 144 accommodated in the groove 1401, via the limiting surface 1220 and the front end surface of the inner housing, respectively, and is thus fastened in the intended position of the outer housing 14, wherein the inner housing cannot move forward or backward in the axial direction by virtue of the fit between the inner housing and the outer housing.

Furthermore, an annular spring, the inner shape of which is formed as an inverted triangle, is provided as the shielding element 146 accommodated in the shielding element accommodating section 1406 of the outer housing 14. It can be seen from the view in section that the shielding element 146 has the shape of an apex on the inner side, wherein the internal diameter is slightly smaller than the external diameter of the insulating layer of the cable 6. When connecting the cable 4 and the contact 10, when it is plugged into the inner housing 12 and outer housing 13, the shielding element 146 accommodated in the shielding element accommodating section 1406 of the outer housing 14 is inclined when the cable 4 is plugged in in the direction of insertion, and the apex on the inner side of the shielding element penetrates the insulating outer layer of the cable 4 and touches the layer of the EMC braid in the insulating outer layer of the cable, namely the electromagnetic shielding layer, such that the electromagnetic field generated by the transmission of high alternating current cannot be transmitted to the outside. As a result, the cable 4 is better shielded electromagnetically.

Figure 7:
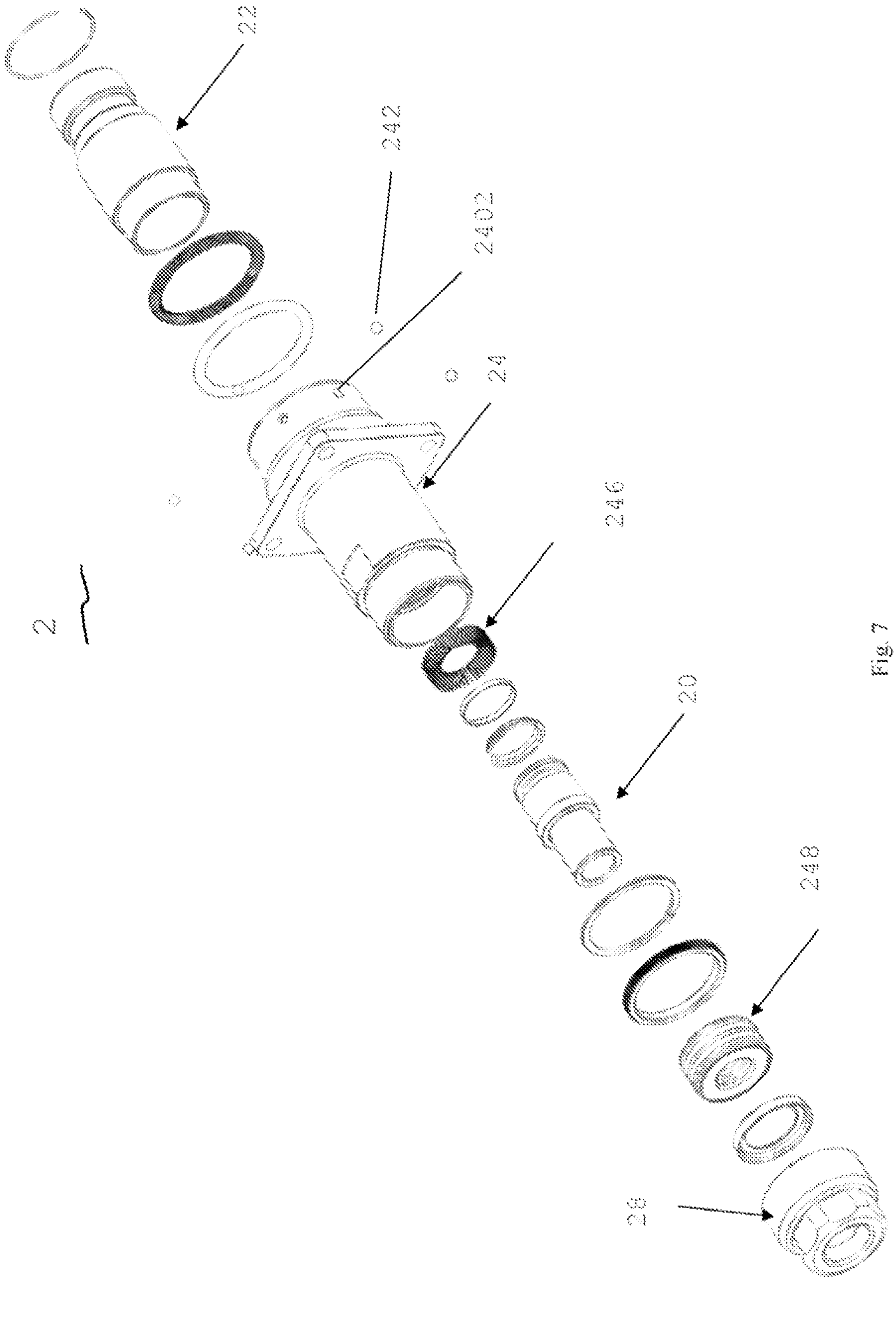
FIG. 7 shows a perspective exploded view of a mating plug according to the present invention.

A mating plug 2 provided for the plug 1 is illustrated in FIG. 7. The mating plug 2 also mainly comprises a contact 20, an inner housing 22, and an outer housing 24.

Figure 8:
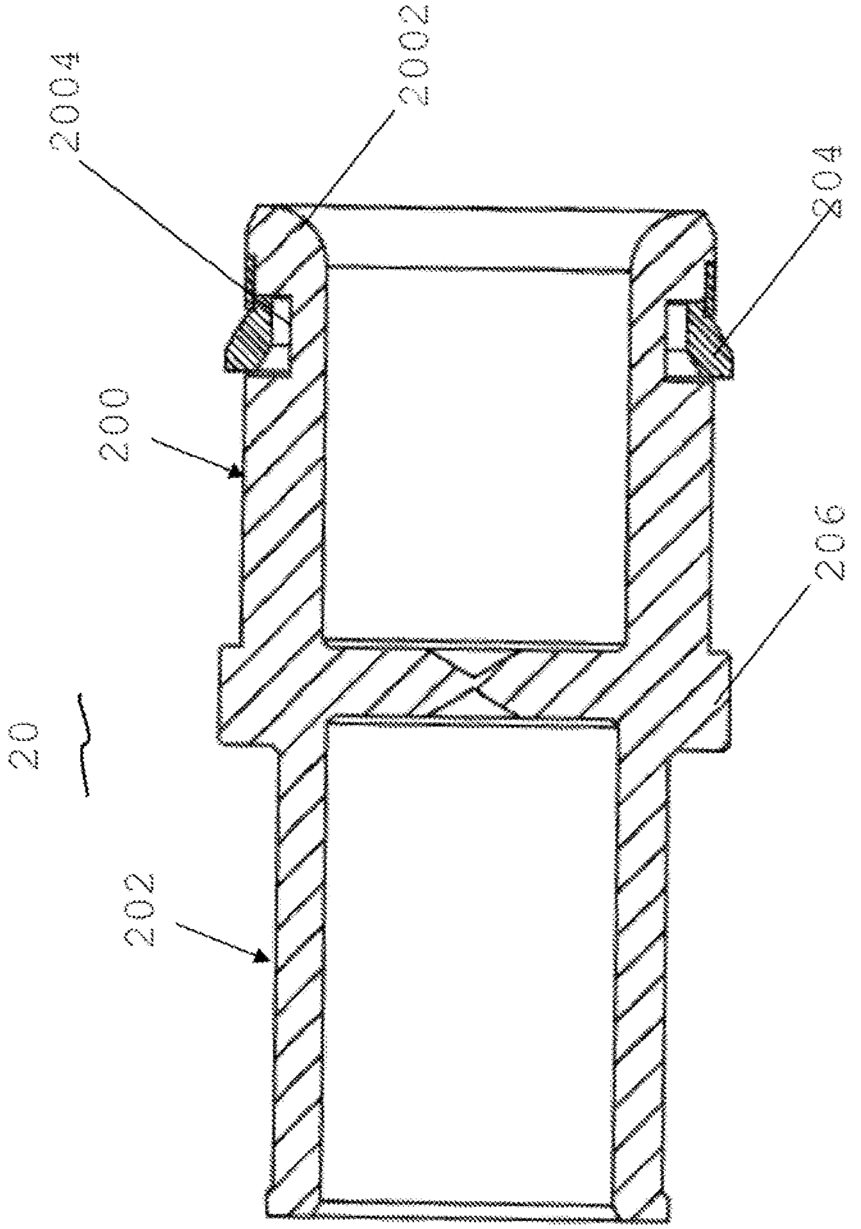
FIG. 8 shows a view in section of a contact of the mating plug according to the present invention.

As illustrated in FIG. 8, the overall shape of the contact 20 is essentially cylindrical, wherein the contact is produced as a single piece from C1100 copper. Differently from the plug 1, the contact comprises, seen in the direction of insertion, consecutively just a contact insertion section 200 and a contact connecting section 202. The internal diameter of the contact 20 at the contact insertion section 200 is here essentially the same as the internal diameter at the contact connecting section 202. Furthermore, the contact insertion section 200 is also used as a contact fastening section and protrudes outward from the outer surface of the rear end in the radial direction in order to form an annular flange, namely an abutment section 206. At the front end, the contact insertion section 200 has an inner curvature 2002 in order to facilitate joining to the outer curvature of the contact 10 of the corresponding plug connector 1 such that insertion can be performed quickly and simply. In the direction of insertion, the contact 20 has a contact fastening recess 2004 at the front end of the contact insertion section 200 in order to receive an elastic fastening element 204 produced from rubber.

Figure 9:
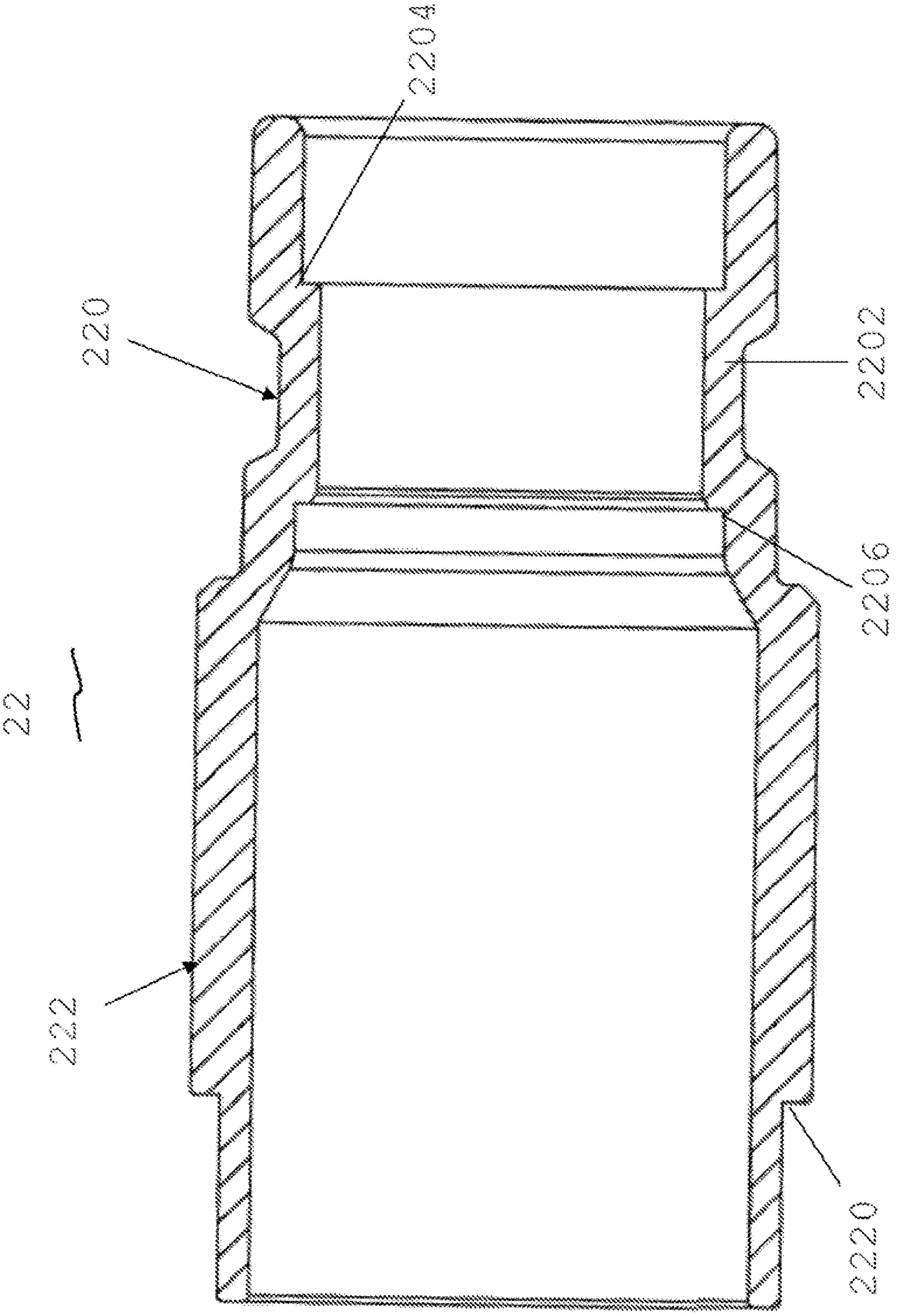
FIG. 9 shows a view in section of an inner housing of the mating plug according to the present invention.

As illustrated in FIG. 9, the inner housing 22 of the mating plug 2 is an insulating housing which has an essentially cylindrical overall shape and is formed in a single piece from an insulating material, preferably from insulating rubber (EPDM and SR) or plastic (PPS). Seen in the direction of insertion, the inner housing comprises consecutively an inner housing insertion section 220 and an inner housing fastening section 222. The external diameter of the inner housing fastening section 222 is preferably larger than the external diameter of the inner housing insertion section 220. The inner housing insertion section 220 is preferably also used as a fastening contact. For this purpose, the central section of the inner housing insertion section 220 has an inwardly curved annular fastening section 2202. The rear segment of the inner housing fastening section 222 has steps, averted in the direction of insertion, which are matched to the corresponding steps of the outer housing 24 in order to prevent the inner housing 22 from moving counter to the direction of insertion.

Figure 10:
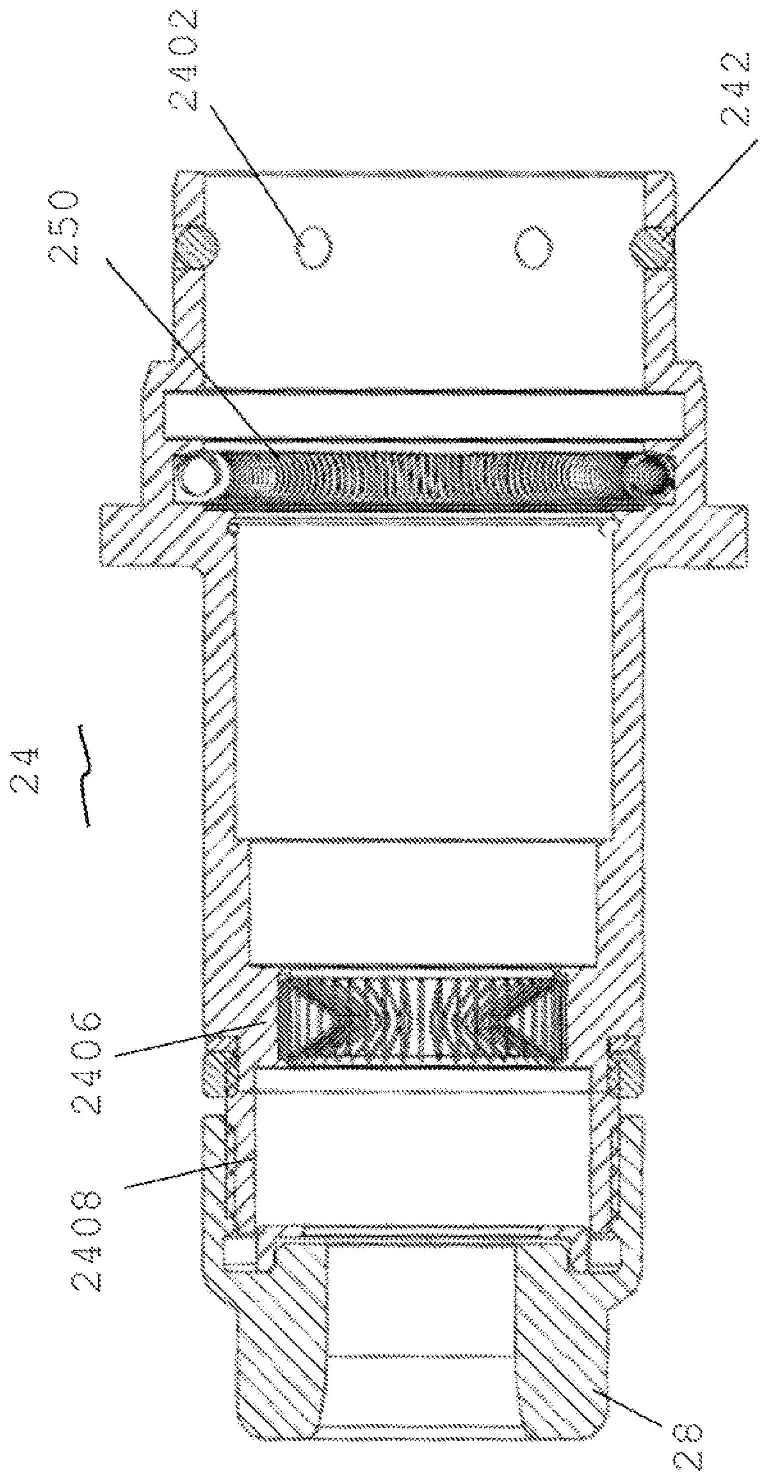
FIG. 10 shows a view in section of an outer housing of the mating plug according to the present invention.

As illustrated in FIG. 10, the outer housing 24 of the mating plug 2 is produced from conductive metal, preferably from nickel-plated aluminum, the outer housing also having an essentially cylindrical overall shape.

At its rear end, the outer housing 24 has an inwardly protruding shielding element accommodating section 2406 for accommodating the shielding element 146 in order to shield an attached high-current cable 6 electromagnetically. The shielding element 246 is produced from metal and has the shape of an inverted triangle. Its outer side touches the outer housing in order to establish a conductive connection such that the cable is better shielded electromagnetically.

Furthermore, the outer housing 24 comprises, at its insertion section for the outer housing 14 of the plug connector 1, consecutively from front to back in the direction of insertion, a depression 2402 for accommodating the locking device, a shielding element accommodating section 2406, and a sealing element accommodating section 2408 in order to accommodate respectively a locking device 242, a shielding element 246, and a sealing element 248. In the present invention, the locking device 242 is preferably a plurality of locking bulges, the depression 2402 being a plurality of through holes passing through the outer housing 24 in the radial direction, and the shielding element 26 accommodated in the shielding element accommodating section 2406 being an annular spring ring.

Furthermore, a thread is provided on the outer housing 24 on the outer surface of the sealing element accommodating section 2408 in order to form a threaded connection with the fastening element 28, also produced from metal, such that the elastic sealing element 50 is fastened in the sealing element accommodating section 2408.

Figure 11:
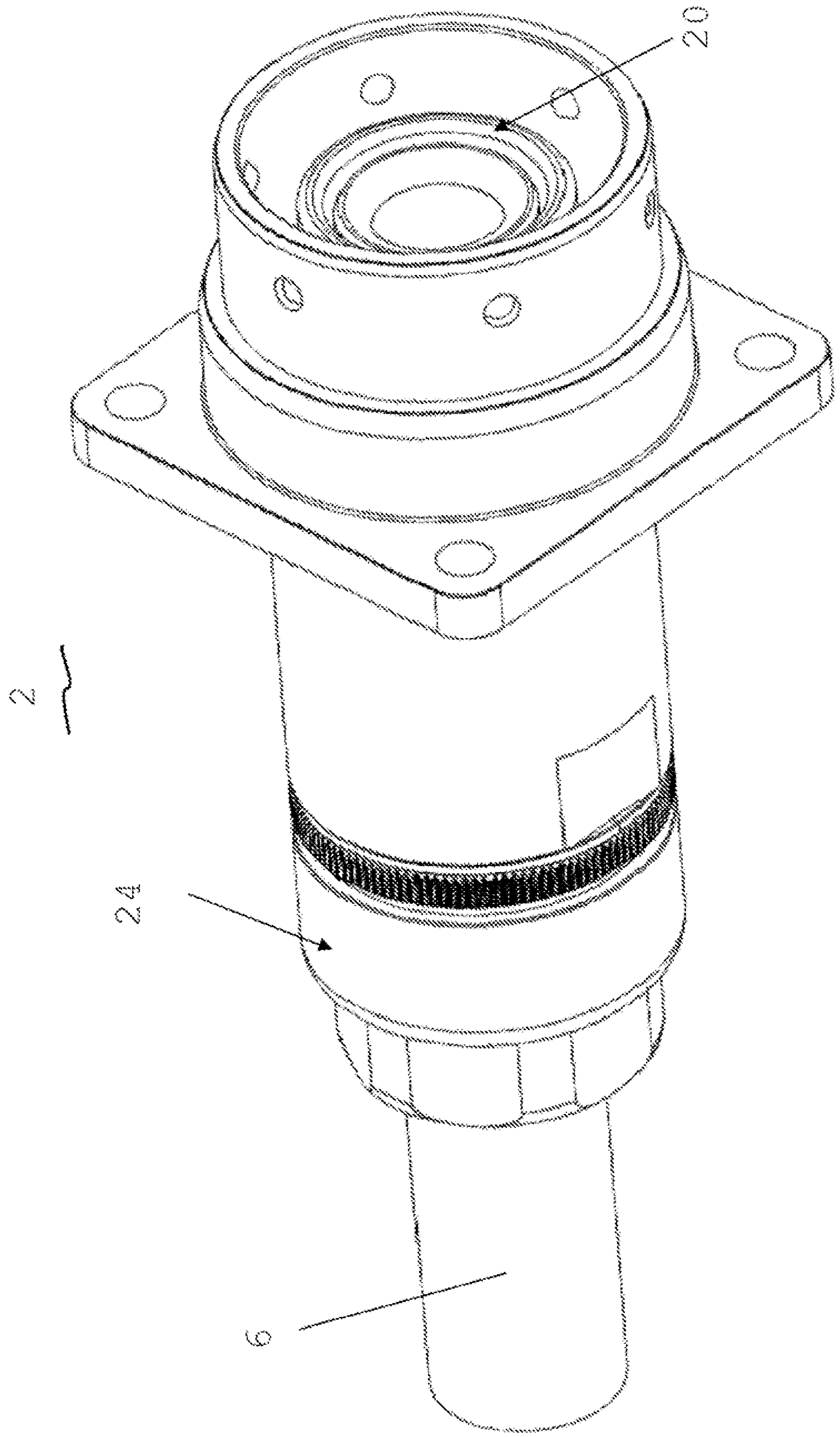
FIG. 11 shows a perspective view of a mating plug with a cable according to the present invention.

FIG. 11 shows a perspective view of an installed mating plug 2 according to the present invention with the attached cable 6. When installing the mating plug 2 and the cable, the cable 6 is fastened firmly to the mating plug 2 without the final step of tightening the screw. The reason for this is that the mating plug 2 is generally fastened in an appliance and there is therefore no tensile force generated by the pulling of the cable 6. Of course, in an optional solution a bolt fastening device can also be arranged on the fastening element 28 of the outer housing 24 of the mating plug 2, as is the case for the outer housing 14 of the plug connector 1.

Figure 12:
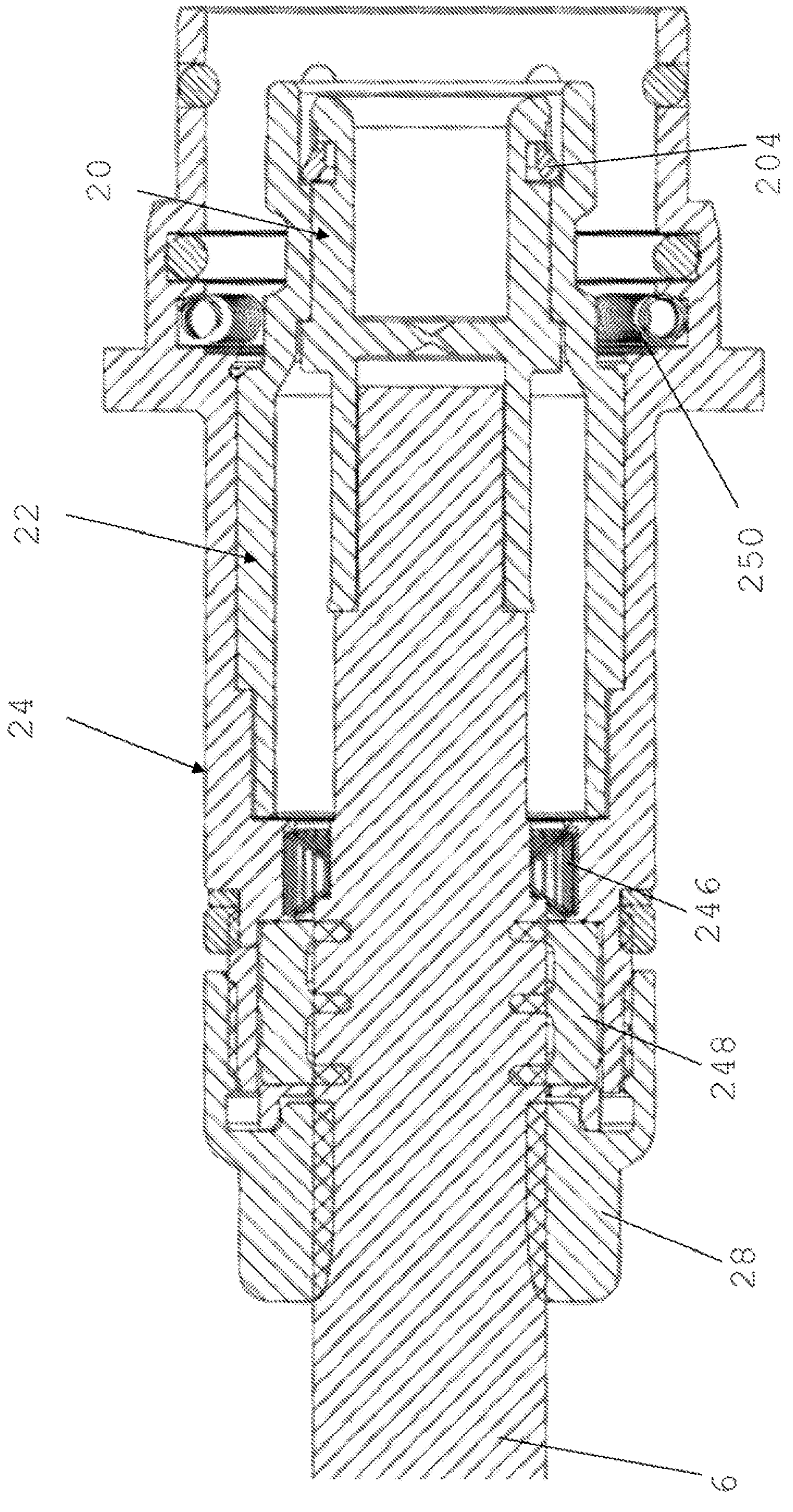
FIG. 12 shows a schematic view of the installation of a plug connector with a cable according to the present invention.

A view in section of the mating plug 2 and the cable after installation is illustrated in FIG. 12. It can be seen in FIG. 12 that the contact 20, owing to the elastic fastening element 204 accommodated in the contact fastening recess 2004 and the abutment section 206 is in each case connected to the stepped section 2204 and the contact limiting surface 2206 on the inner side of the inner housing 22 and hence fastened in an appropriate position of the inner housing 22, wherein the contact cannot move forward or backward in the axial direction by virtue of the fit between the contact and the inner housing. The inner housing 22 is connected to the shoulder 2220 of the outer housing 24 by a limiting surface of the inner housing 2220 and is thus fastened in the intended position of the outer housing 24, wherein the inner housing cannot move backward in the axial direction owing to the fit between the inner housing and the outer housing. Furthermore, an annular spring, the inner shape of which is formed as an inverted triangle, is provided as the shielding element 246 accommodated in the shielding element accommodating section 2406 of the outer housing 24. It can be seen from the view in section that the shielding element has the shape of an apex on the inner side, wherein its internal diameter is slightly smaller than the external diameter of the insulating layer of the cable 6. When connecting the cable 6 and the contact 20, when it is plugged into the inner housing 22 and outer housing 24, the shielding element 246 accommodated in the shielding element accommodating section 2406 of the outer housing 24 is inclined when the cable 6 is plugged in in the direction of insertion, and the apex on the inner side of the shielding element penetrates the insulating outer layer of the cable 6 and touches the layer of the EMC braid in the insulating outer layer of the cable, namely the electromagnetic shielding layer. As a result, the cable 6 is better shielded electromagnetically.

Figure 13:
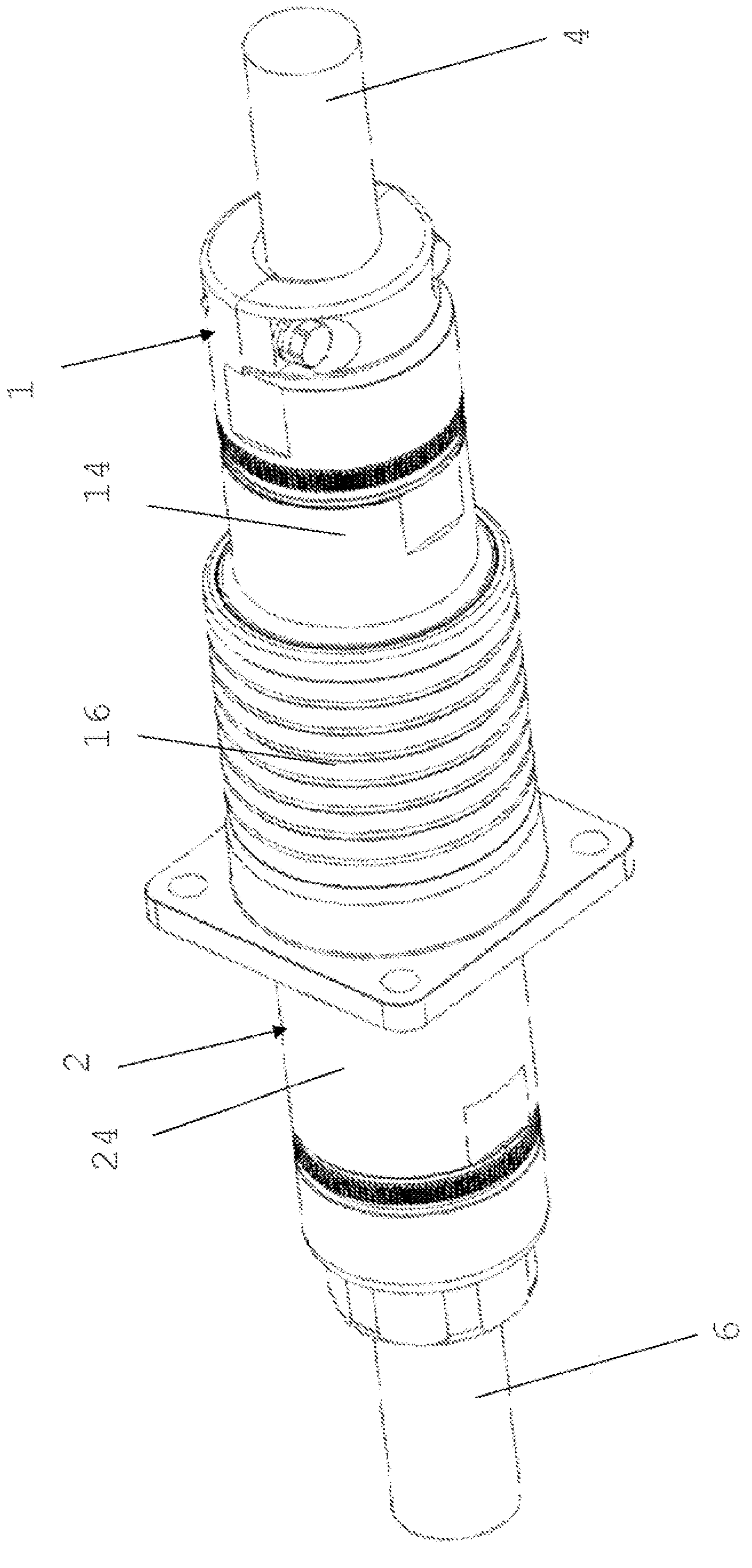
FIG. 13 shows a perspective view of a plug connector assembly with the cable according to the present invention.
Figure 14:
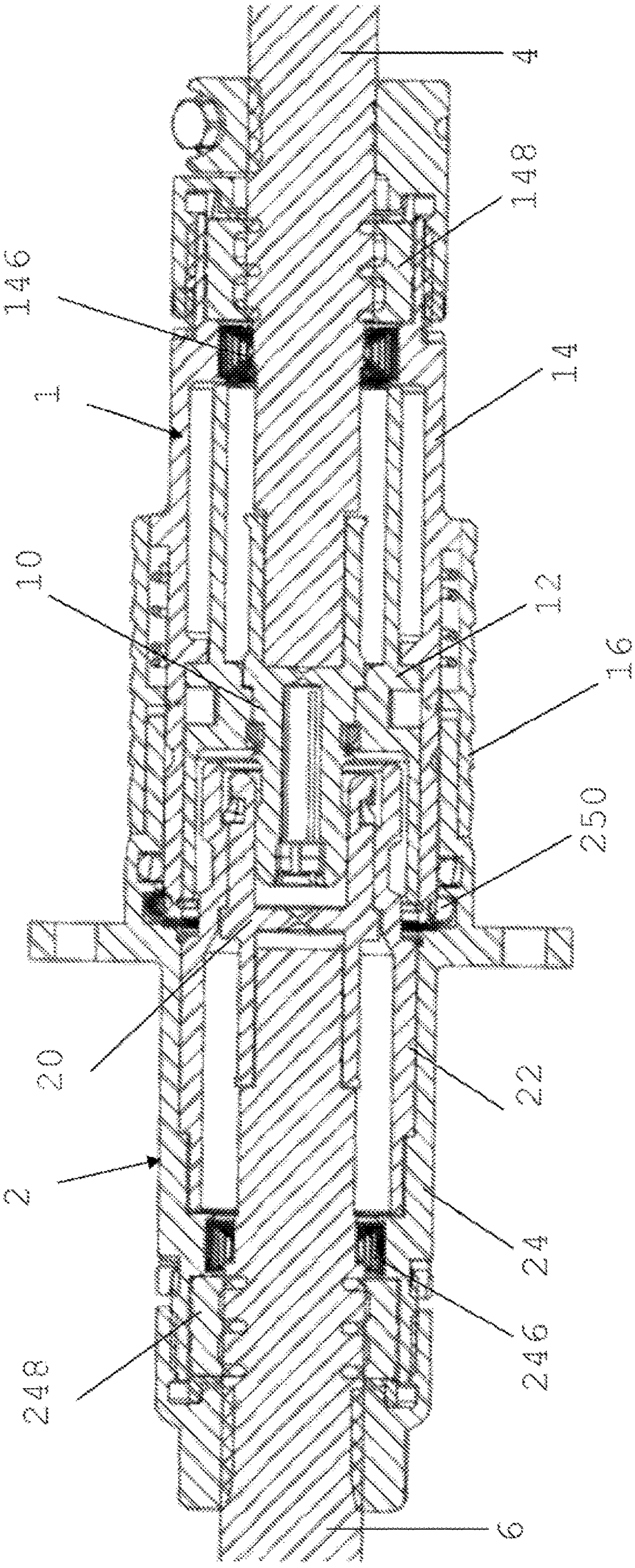
FIG. 14 shows a view in section of a plug connector assembly with the cable according to the present invention.

The plug connector assembly is illustrated in FIGS. 13 and 14, wherein the plug connector 1 is inserted into the mating plug 2. When coupling the plug connector 1 to the mating plug 2, they are first aligned with each other and inserted into each other. The outer housing 24 of the mating plug 2 pushes the sliding element 16 backward on the outer housing 14 of the plug connector, and the spring is compressed therein until the locking device 242 at the outer housing 24 of the mating plug 2 engages in the groove 1401 provided on the outer housing 14 of the plug connector 1. It can be seen in particular from the view in section according to FIG. 14 that the locking device 242, accommodated in the depression 2402 of the outer housing 24, of the mating plug 2 is connected in the insertion position to the groove 1401 of the outer housing 14 of the plug connector 1. Insertion generates a "click" noise to alert the user that the correct insertion position has been reached and to prevent the user from exerting more force. As a result, the contact 10 of the plug connector 1 and the contact 20 of the mating plug 2 are protected from being damaged when excessive force is applied during insertion. Furthermore, the plug connector 1 and the mating plug 2 can be prevented from becoming detached within a specific tensile force range in order to prevent the quality of the current transmission from being adversely affected.

It can furthermore be seen from the view in section according to FIG. 14 that the shielding element 146 accommodated at the rear end of the outer housing 14 of the plug connector 1 penetrates the outer insulating layer of the cable 4 and establishes a conductive connection with the layer of the EMC braid inside, namely the electromagnetic shielding layer, in order additionally to shield the cable 4 electromagnetically. The shielding element 246 accommodated at the rear end of the outer housing 24 of the mating plug 2 penetrates the outer insulating layer of the cable 6 and establishes a conductive connection with the layer of the EMC braid in the interior, namely the electromagnetic shielding layer, in order additionally to shield the cable 6 electromagnetically. Furthermore, the shielding ring 250 accommodated in the outer housing 24 of the mating plug 2 touches the front end of the outer housing 14 of the plug connector 1. Because the shielding element 146 is conductively connected to the metal outer housing 14 of the plug connector 1, the shielding element 246 is conductively connected to the metal outer housing 24 of the mating plug 2, and the shielding ring 250 is conductively connected to the metal outer housing 14 of the plug connector 1 and the metal outer housing 24 of the mating plug 2, the cables 4 and 6 are better shielded electromagnetically such that only a reduced electromagnetic influence on the electronic components, such as printed circuit boards, etc, present in the peripheral surroundings is generated when high currents are transmitted.

The plug connector assembly with the plug and the mating plug according to the present invention is explained in detail above. However, the detailed exemplary embodiments only represent preferred embodiments, wherein the structure of the plug connector assembly of the present invention is not limited. A person skilled in this art can accordingly modify the physical structure of the plug connector and the mating plug on the basis of the exemplary embodiments of the present invention. For example, the detailed structures of the inner housing, the outer housing of the plug connector and the mating plug, and of the plug connection section or the fastening section for the contacts are interchangeable as long as the fit between the two ensures the corresponding function.

LIST OF REFERENCE NUMERALS

1 plug connector
10 contact
100 contact insertion section
1000 slot
1002 outer curvature
1004 recess
102 contact fastening section
1020 fastening recess
1022 cable termination surface
104 contact connecting section
106 abutment section
108 elastic fastening element of the contact
12 inner housing
120 inner housing insertion section
122 inner housing fastening section
1220 inner housing limiting surface
1222 blocking surface
1224 contact limiting surface
1226 stepped section
124 inner housing connecting section
14 outer housing
1401 groove
1402 limiting projection
1404 locking groove
1406 shielding element accommodating section
1408 sealing element accommodating section
144 elastic retaining ring
146 shielding element
148 sealing element
16 sliding element

17 L-shaped compression ring
18 fastening element
2 mating plug
20 contact
200 contact insertion section
2002 inner curvature
2004 fastening recess
202 contact connecting section
204 elastic fastening element
206 abutment section
22 inner housing
220 inner housing insertion section
2202 fastening ring section
2204 stepped section
222 inner housing fastening section
2220 inner housing fastening surface
24 outer housing
2402 depression
2406 shielding element accommodating section
2408 sealing element accommodating section
242 locking device
246 shielding element
248 sealing element
250 shielding ring
28 fastening element
4 cable
6 cable

The invention claimed is:

1. A plug connector configured for electrically conductively connecting an electric cable attached thereto to a mating plug, comprising:

at least one electrically conductive contact;

an insulating inner housing which has a fastening section for fastening the contact;

a conductive outer housing which has a fastening section for fastening the inner housing;

wherein the plug connector furthermore comprises a first shielding element, electrically connected to the conductive outer housing, configured for penetrating an insulating outer layer of a cable connected by the plug connector to establish an electrical contact with the electromagnetic shielding layer in the insulating outer layer of the cable in order to provide a further electromagnetic shielding function for the cable, and wherein the plug connector comprises a second shielding element, accommodated in the conductive outer housing, configured for electrical contact with the conductive outer housing of the plug connector and the conductive outer housing of a mating plug connected to the plug connector in order to provide a further electromagnetic shielding function for the cable.

2. The plug connector as claimed in claim 1, wherein the first shielding element is in the form of an inverted triangle, one side of which is in conductive contact with the conductive outer housing, whilst the lower apex is in electrical contact with the electromagnetic shielding layer of the cable.

3. The plug connector as claimed in claim 1, wherein the first shielding element is produced from a metal selected from the group consisting of copper, steel, aluminum and brass.

4. The plug connector as claimed in claim 3, wherein the metal comprises an aluminum alloy, the surface of which is electrolessly nickel-plated.

5. The plug connector as claimed in claim 1, wherein the second shielding element is an annular spring ring which is in peripheral contact with the conductive outer housing of the plug connector and the conductive outer housing of the mating plug.

6. The plug connector as claimed in claim 5, wherein the second shielding element is formed of a stainless metal selected from the group consisting of copper, steel, aluminum and brass.

7. The plug connector as claimed in claim 1, wherein the plug connector comprises an insulating sealing element, accommodated in the conductive outer housing, which is in engagement with the outer insulating layer of the cable in order to provide a watertight seal.

8. The plug connector as claimed in claim 7, wherein the plug connector comprises an L-shaped compression element configured to transmit the thrust force simultaneously to the sealing element, owing to a connection between the fastening element of the plug connector and the conductive outer housing, such that the sealing element generates a radial expansion and hence forms a solid sealing fit with the cable.

9. The plug connector as claimed in claim 1, wherein the conductive outer housing is formed of metal.

10. The plug connector as claimed in claim 9, wherein the metal comprises an electrolessly nickel-plated aluminum.

11. A plug connector assembly, comprising the plug connector as claimed in claim 1, and a mating plug coupled to the plug connector, wherein said plug connector assembly comprises:

a conductive contact;

an insulating inner housing which has a fastening section for fastening the contact;

a conductive outer housing which has a fastening section for fastening the inner housing;

wherein the mating plug furthermore comprises a third shielding element, connected conductively to the conductive outer housing and confirmed to penetrate an insulating outer layer of a cable connected to the mating plug to establish electrical contact with the electromagnetic shielding layer in the insulating outer layer of the cable in order to provide a further electromagnetic shielding function for the cable, and wherein the first shielding element, the second shielding element, and the third shielding element each form an electrical contact with the outer housing of the plug connector and the outer housing of the mating plug to provide complete electromagnetic shielding for a cable connected by the plug connector and for a cable connected to the mating plug, and for the plug connector assembly.

12. The plug connector assembly as claimed in claim 11, wherein the third shielding element is in the form of an inverted triangle, the upper side of which is in conductive contact with the conductive outer housing of the mating plug, whilst the lower apex is in electrical contact with the electromagnetic shielding layer of the cable.

13. The plug connector assembly as claimed in claim 12, wherein the third shielding element is formed of metal.

14. The plug connector assembly as claimed in claim 13, wherein the third shielding element is formed of stainless metal.

15. The plug connector as claimed in claim 1, wherein the first shielding element and/or the second shielding element is a round spring, a triangular spring, or a laminated spring and/or the first shielding element and/or the second shielding element have brush contacts.

16. The plug connector as claimed in claim 15, wherein the second shielding element is formed of a stainless metal selected from the group consisting of copper, steel, aluminum and brass.

* * * * *